Feb. 11, 1964  H. A. KOPPS  3,120,835
MULTIPLE TROUGH ANIMAL FEEDING DEVICE
Filed March 16, 1962  2 Sheets-Sheet 1

INVENTOR.
HARRY A. KOPPS
BY
Talbert Dick & Earley
ATTORNEYS

WITNESS
NORMAN G. TRAVISS

Feb. 11, 1964  H. A. KOPPS  3,120,835
MULTIPLE TROUGH ANIMAL FEEDING DEVICE
Filed March 16, 1962  2 Sheets-Sheet 2

INVENTOR.
HARRY A. KOPPS
BY
Talbert Dick & Farley
ATTORNEYS

WITNESS
NORMAN G. TRAVISS

United States Patent Office 3,120,835
Patented Feb. 11, 1964

3,120,835
MULTIPLE TROUGH ANIMAL FEEDING DEVICE
Harry A. Kopps, Griggsville, Ill.
Filed Mar. 16, 1962, Ser. No. 180,235
9 Claims. (Cl. 119—52)

This invention relates to the raising of animals and more particularly to an animal feeding means.

The use of animal feeding troughs is old. The usual feeding trough construction consists of an open trough and a feed supply compartment that automatically furnishes the feed to the trough as the feed is consumed by the animals from the feeding trough. In recent times, and particularly in the raising of swine, more than one type of feed is used. This may be a mixture of well-known food matter, but usually is of a common feed fortified by a food supplement. In either case, the material must be mixed and enters the trough in such mixed condition. The animal therefore has no choice of selection. If an enriched mineral, vitamin, or like food supplement is used, one given animal may require a greater or lesser relative amount of enriched matter than that of another animal. Each individual animal will, if given a choice, choose the proper food for its particular need. This is impossible with herebefore feeders.

Therefore one of the principal objects of my invention is to provide an animal feeding device that permits an animal to choose between at least two different foods.

A still further object of this invention is to provide a multiple food dispensing device for animals that eliminates the necessity of mixing the two or more foods being furnished to the animals.

Still further objects of my invention are to provide an animal feeding device that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

From a viewing of the drawings, it is obvious that I accomplish my desired results by employing a double trough unit with each trough having a separate feed supply means. Most feeders supply feed to each side thereof. My feeder is of this type and therefore my feeder is capable of supplying, if desired, three separate foods, each of a different character.

Figure 1:
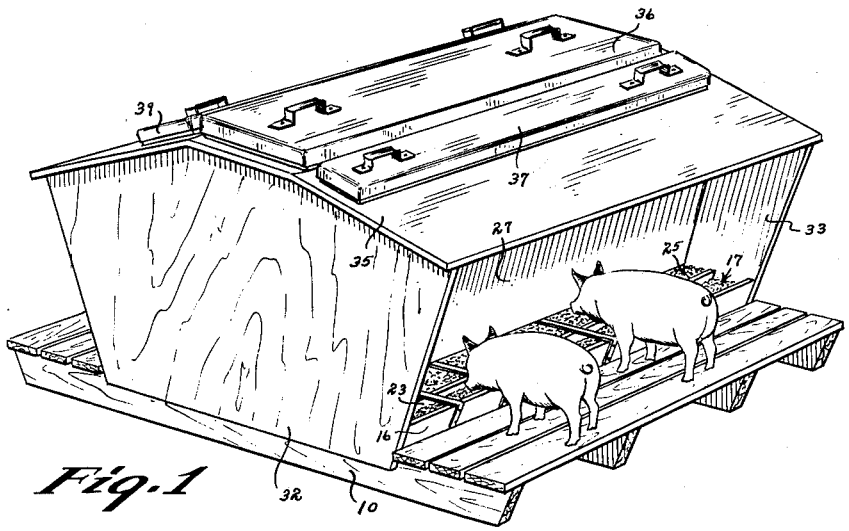
FIG. 1 is a perspective view of my feeder in use.
Figure 2:
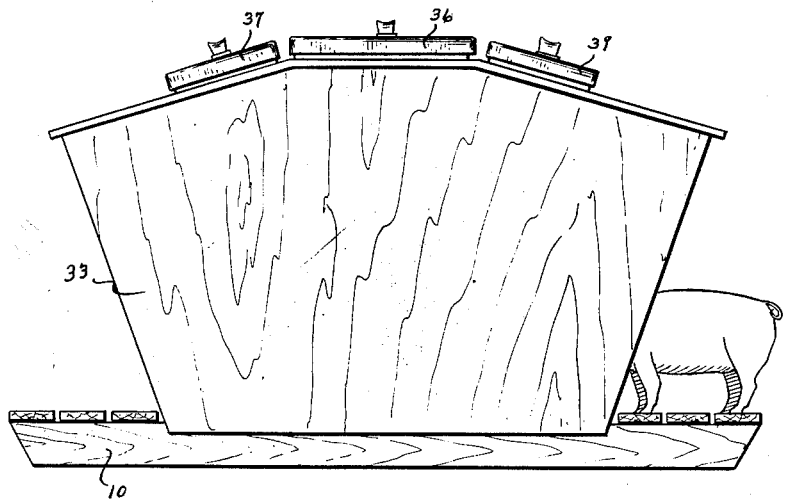
FIG. 2 is an end view of the device.
Figure 3:
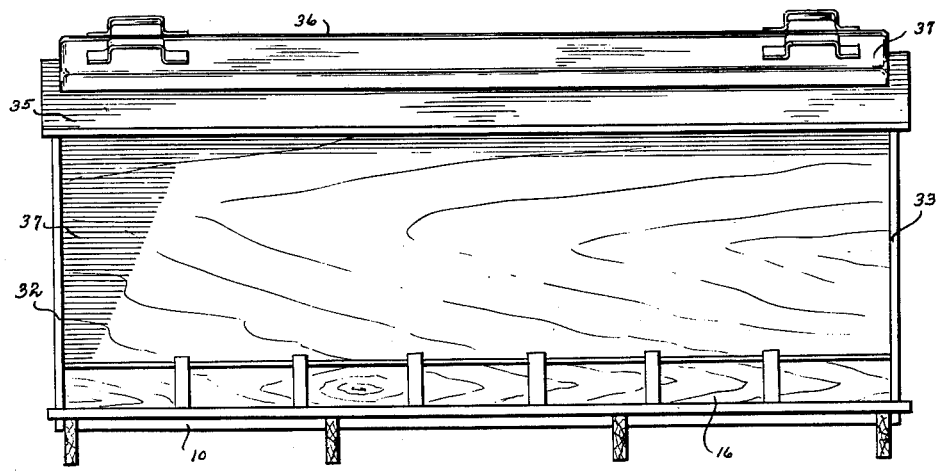
FIG. 3 is a side view of the feeder.
Figure 4:
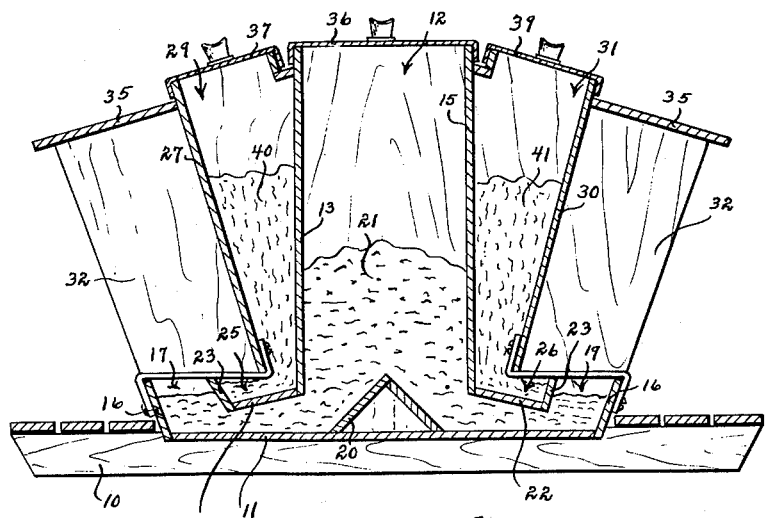
FIG. 4 is a cross-sectional view of my animal feeder and more fully illustrates its construction.

The numeral 10 generally designates a base frame portion. The numeral 11 designates a floor portion on the base 10. Operatively supported longitudinally of the floor 11, and communicating with the longitudinal central area of the floor is the central feed supply compartment 12. The two side walls of the compartment 12 are designated by the numerals 13 and 15, respectively. At each side edge of the floor portion 11 is an outer trough side wall 16, as shown in FIG. 4. By this construction two outer side trough portions 17 and 19 are created. The numeral 20 designates a longitudinal divide on the center longitudinal line of the floor 11 to divide and guide feed 21 from the compartment 12 downwardly and outwardly into the outer side trough areas 17 and 19. The walls 13 and 15 terminate a substantial distance above the floor 11 and each wall 13 and 15 has at its lower edge, a trough floor 22 that extends outwardly and downwardly from the compartment 12. At the outer side edge of each of the trough floors 22 is an upwardly extending outer side trough wall 23. By this construction, the lower portions of the walls 13 and 15, the floors 22, and the walls 23 form the two trough portions 25 and 26. The trough 25 will be inwardly of the trough area 17 and the trough 26 will be inwardly of the trough area 19. The two trough portions 25 and 26 are spaced above the floor 11 so that feed 21 from the compartment 12 may pass thereunder to the outer areas of the outer troughs 17 and 19, respectively. Thus, the troughs 25 and 26 act as a limiting barrier preventing an excessive amount of feed 21 to pass into the troughs 17 and 19. At the outer side and spaced apart from the wall 13 is a wall 27, creating a feed supply compartment 29 which has its open bottom end communicating with the inside rear of the trough 25. At the outer side and spaced apart from the wall 15 is a wall 30 creating a feed supply compartment 31 which has its open bottom end communicating with the inside rear of the trough 26. The closing ends of the compartments 12, 29, and 31 and troughs are designated by the numerals 32 and 33, respectively. These ends 32 and 33 may extend beyond the longitudinal planes of the troughs, to protect the same against the elements. The numeral 35 designates a roof over the compartments 12, 29 and 31. This roof also extends in spaced relationship over and above all the troughs. The roof 35 has a lid means 36 communicating with the inside top of the compartment 12. A similar lid means 37 communicates with the inside top of the compartment 29. A similar lid means 39 communicates with the inside top of the compartment 31.

From the foregoing it will be seen that I have provided a feeder having four troughs 17, 19, 25 and 26. The feed from the compartment 12 will flow under the two troughs 25 and 26 into the troughs 17 and 19. This feed will be of common character for the two troughs 17 and 19. Feed 40 will flow from the campartment 29 into the trough 25. Feed 41 will flow from the compartment 31 into the trough 26. The feed 40 may be of the same character as the feed 41, or if desired, it may be of a different type. However, usually the feed 21 will be common general feed, and the feeds 40 and 41 will be of the same type, i.e., enriched food supplement. The feeding animal will therefore at least have a choice of eating two different types of food. Normally, the animal will eat its desired amount of food from one trough and then switch to the other trough and eat its desired amount of food from such other trough. Not only does this permit the animal to choose the amount of feed that is good for it, but it saves the animal raiser much time and labor by not requiring him to mix the various types of food being fed to the animals. The different types of feed are placed in the respective supply compartments through the door lids 36, 37 and 39.

Some changes may be made in the construction and arrangement of my animal feeding device without departing from the real spirit and purpose of my invention, and it is my intention to cover by my claims, any modified forms of structure or use of mechanical equivalents which may be reasonably included within their scope.

I claim:

1. In an animal feeder, comprising in combination,
   (a) a first trough portion,
   (b) a second trough portion positioned at the rear of said first trough portion,
   (c) a first feed compartment communicating with the underside of said second trough portion and communicating with the inside of said first trough portion, and (d) a second feed compartment communicating with the inside of said second trough portion.

2. In an animal feeder, comprising in combination,
(a) a first trough portion,
(b) a second trough portion positioned at the rear upper area of said first trough portion,
(c) a first feed compartment communicating with the underside of said second trough portion and communicating with the inside of said first trough portion, and
(d) a second feed compartment communicating with the inside of said second trough portion.

3. In an animal feeder, comprising in combination,
(a) a first trough portion having a relatively large width,
(b) a second trough portion in the rear upper area of said first trough portion with its bottom spaced apart from and above the inside rear bottom of said first trough to provide a feed passageway extending under said second trough portion to the inside outer area of said first trough portion,
(c) a first feed supply compartment communicating with the passageway extending under said second trough portion, and
(d) a second feed supply compartment communicating with the inside of said second trough portion.

4. In an animal feeder, comprising in combination,
(a) a first trough portion having a relatively large width,
(b) a second trough portion in the rear upper area of said first trough portion with its bottom spaced apart from and above the inside rear bottom of said first trough to provide a feed passageway extending under said second trough portion to the inside outer area of said first trough portion,
(c) a first feed supply compartment communicating with the passageway extending under said second trough portion,
(d) a second feed supply compartment communicating with the inside of said second trough portion,
(e) a lid door communicating with the inside top of said first compartment, and
(f) a lid door communicating with the inside top of said second compartment.

5. In an animal feeder, comprising in combination,
(a) a floor,
(b) an outer trough wall at each side edge of said floor creating a first trough portion, and a second trough portion with said floor as a common bottom,
(c) a centrally located first feed supply compartment communicating with the central area of said floor and terminating in spaced relationship above said floor,
(d) a third trough portion on the outer lower side of one of the outer walls of said first feed compartment, spaced above said floor and positioned substantially inwardly from the adjacent first trough wall,
(e) a fourth trough portion on the outer lower side of the other outer wall of said first feed compartment, spaced above said floor and positioned substantially inwardly from the adjacent second trough wall,
(f) a second feed supply compartment communicating with said third trough portion, and
(g) a third feed supply compartment communicating with said fourth trough portion.

6. In an animal feeder, comprising in combination,
(a) a floor,
(b) an outer trough wall at each side edge of said floor creating a first trough portion, and a second trough portion with said floor as a common bottom,
(c) a centrally located first feed supply compartment communicating with the central area of said floor and terminating in spaced relationship above said floor,
(d) A third trough portion on the outer lower side of one of the outer walls of said first feed compartment, spaced above said floor and positioned substantially inwardly from the adjacent first trough wall,
(e) a fourth trough portion on the outer lower side of the other outer wall of said first feed compartment, spaced above said floor and positioned substantially inwardly from the adjacent second trough wall,
(f) a second feed supply compartment communicating with said third trough portion,
(g) a third feed supply compartment communicating with said fourth trough portion, and
(h) a material divider on said floor and below the said first compartment.

7. In an animal feeder, comprising in combination,
(a) a floor,
(b) an outer trough wall at each side edge of said floor creating a first trough portion, and a second trough portion with said floor as a common bottom,
(c) a centrally located first feed supply compartment communicating with the central area of said floor and terminating in spaced relationship above said floor,
(d) a third trough portion on the outer lower side of one of the outer walls of said first feed compartment, spaced above said floor and positioned substantially inwardly from the adjacent first trough wall,
(e) a fourth trough portion on the outer lower side of the other outer wall of said first feed compartment, spaced above said floor and positioned substantially inwardly from the adjacent second trough wall,
(f) a second feed supply compartment communicating with said third trough portion, and
(g) a third feed supply compartment communicating with said fourth trough portion;
(h) said first compartment having one of its walls common with said second compartment and another of its walls common with said third compartment.

8. In an animal feeder, comprising in combination,
(a) a floor,
(b) an outer trough wall at each side edge of said floor creating a first trough portion and a second trough portion with said floor as a common bottom,
(c) a centrally located first feed supply compartment communicating with the central area of said floor and each of said first and second trough portions,
(d) a third trough portion on the outer lower side of one of the outer walls of said first feed compartment, spaced above said floor and positioned substantially inwardly from the adjacent first trough wall,
(e) a fourth trough portion on the outer lower side of the other outer wall of said first feed compartment, spaced above said floor and positioned substantially inwardly from the adjacent second trough wall,
(f) a second feed supply compartment communicating with said third trough portion, and
(g) a third feed supply compartment communicating with said fourth trough portion.

9. In an animal feeder, comprising,
an elongated housing including a pair of end walls and four spaced apart walls extending the length of said housing between said end walls to form three compartments, a floor second to the lower edge of said end walls and having longitudinally extending upstanding side flanges, each of the two inner walls terminating in a first set of longitudinally extending troughs disposed outwardly beyond the adjacent outer walls and towards said adjacent side flanges, said troughs being positioned above said floor, the outer longitudinal surface of said first set of troughs cooperating with said floor and the adjacent flanges to form a second set of troughs, said second set of troughs being in communication with said center compartment to receive feed therefrom under the adjacent first set of troughs, and said second and third compartments being in communication with said first set of troughs respectively to receive feed therefrom.

References Cited in the file of this patent

UNITED STATES PATENTS

| | | |
|---|---|---|
| 1,005,071 | Randall | Oct. 3, 1911 |
| 1,132,973 | Rappleye | Mar. 23, 1915 |
| 2,350,487 | Bales | June 6, 1944 |
| 2,974,634 | Williams et al. | Mar. 14, 1961 |